Dec. 27, 1955    L. E. NORTON    2,728,855
OSCILLATOR-FREQUENCY CONTROL BY RESONANT MODULATION OF GAS
Filed March 8, 1950                6 Sheets-Sheet 2

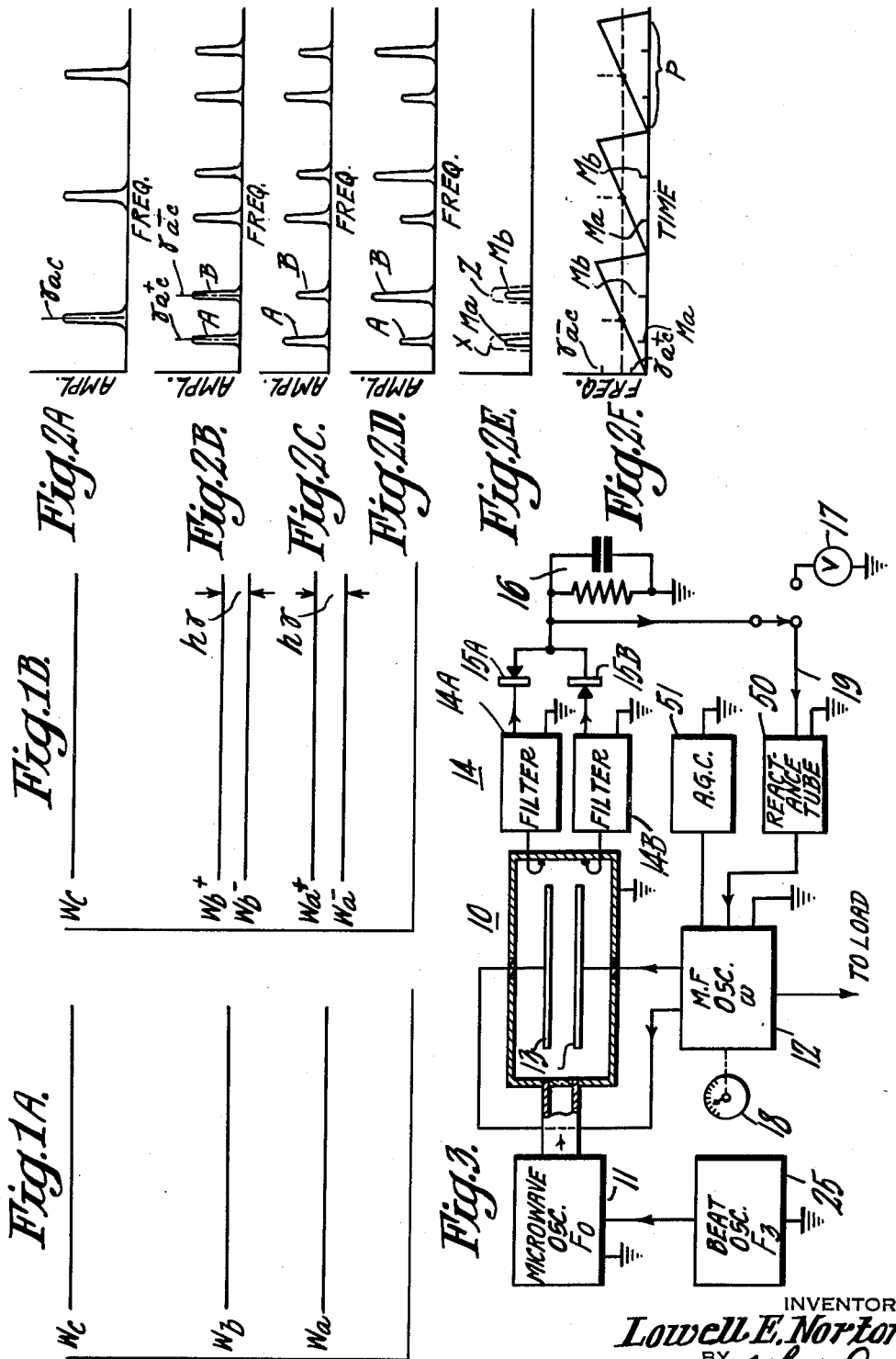

INVENTOR
Lowell E. Norton
BY
ATTORNEY

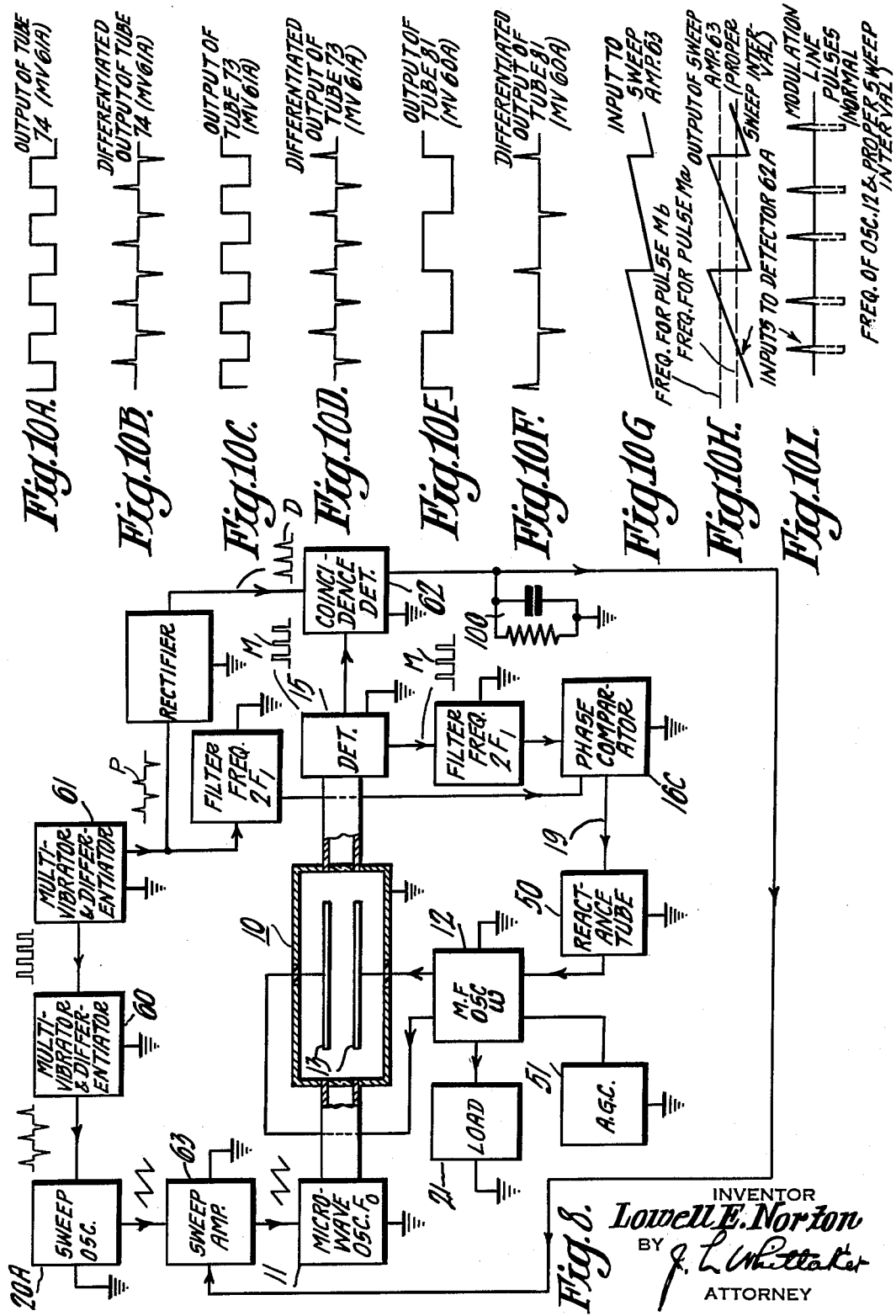

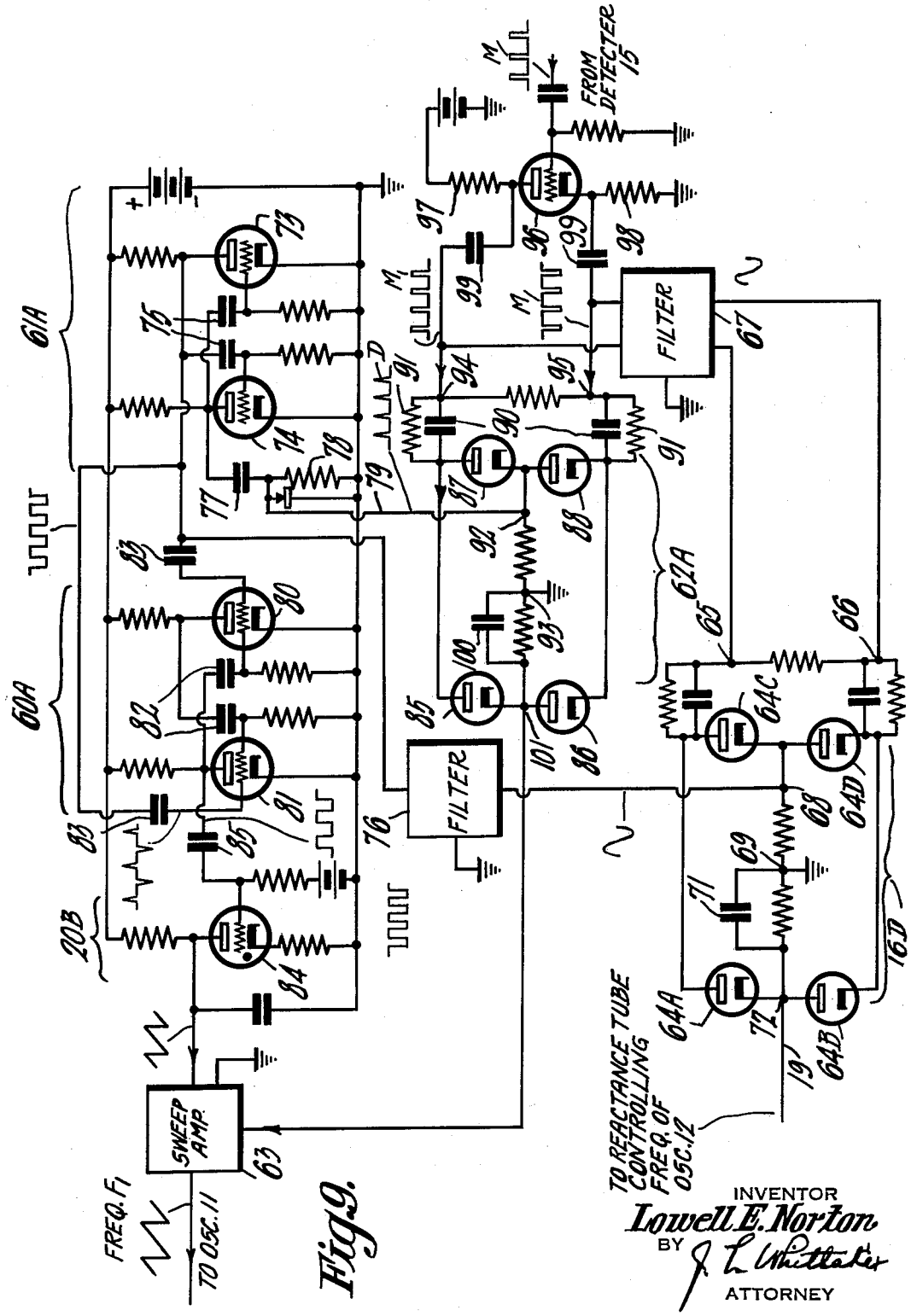

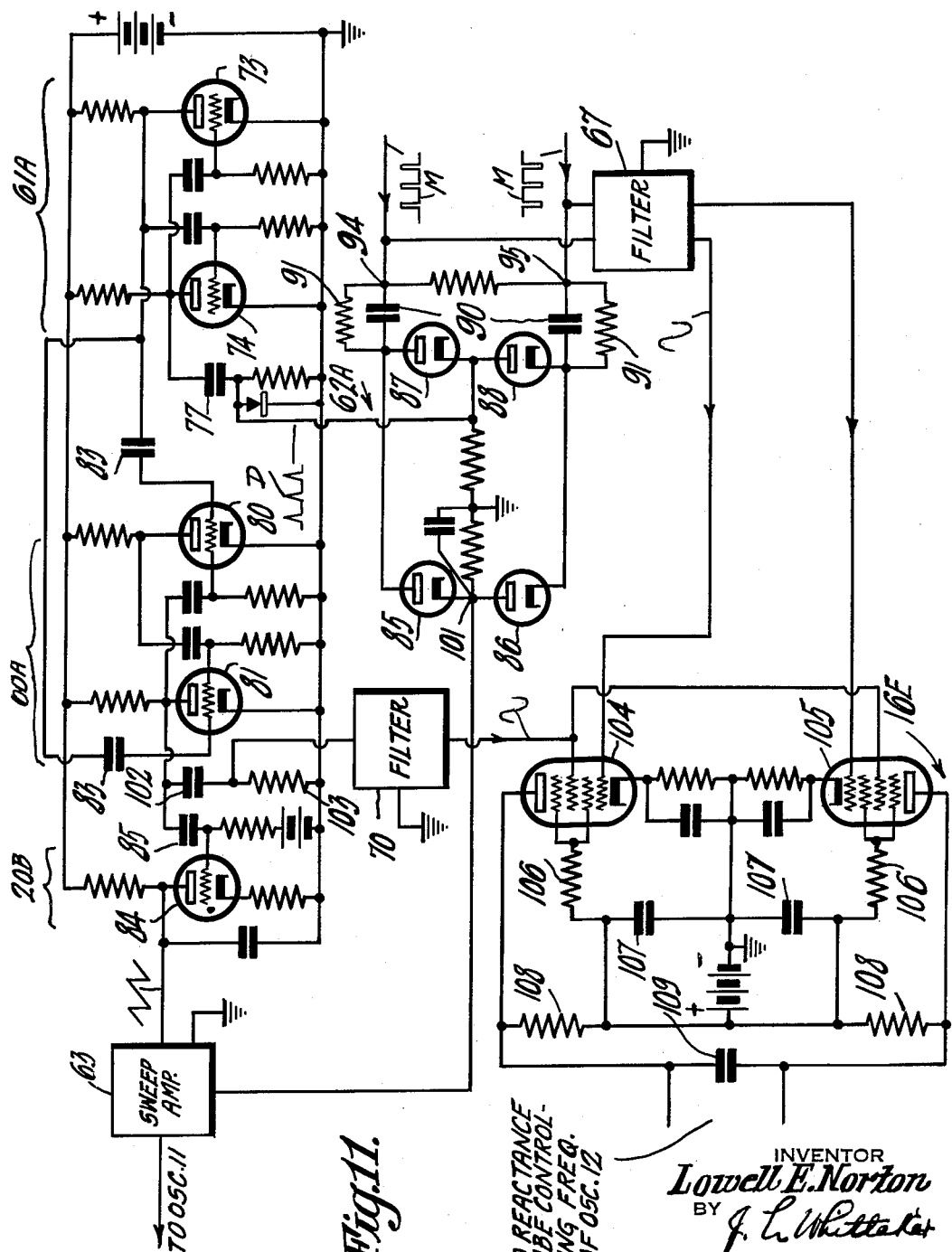

United States Patent Office 2,728,855
Patented Dec. 27, 1955

2,728,855

OSCILLATOR-FREQUENCY CONTROL BY RESONANT MODULATION OF GAS

Lowell E. Norton, Princeton, N. J., assignor to Radio Corporation of America, a corporation of Delaware Application March 8, 1950, Serial No. 148,481

26 Claims. (Cl. 250—36)

This invention relates to methods and systems for utilizing a gas having at least three permitted energy states of its molecule in control of the frequency of an oscillator.

In accordance with the invention, there is concurrently applied to the gas both a microwave field of frequency corresponding with the transition frequency between two of its energy states, and a radio-frequency field corresponding with, or offset by a predetermined amount from, the oscillator frequency. The oscillator frequency corresponds with or is offset by said predetermined amount from a second transition frequency between another two of the energy states of the gas to produce, by "resonant modulation," selective absorption of the microwave energy at two frequencies respectively somewhat higher and lower than the first-named transition frequency. The relative absorptions at these two frequencies is a direct measure of the deviation between the oscillator or offset frequency and the second transition frequency of the gas. The frequency of the oscillation generated by the oscillator therefore may be held at, or offset a predetermined amount from, the second transition frequency by varying a frequency control of the oscillator to maintain substantial equality of the microwave absorptions at the aforesaid two selective-absorption or resonant-modulation frequencies.

More particularly in preferred methods and systems, the frequency of the microwave field is repeatedly swept over a range of frequencies including the two resonant modulation frequencies, respectively higher and lower than the original microwave transition frequency. The microwave energy transmitted by the gas is demodulated to produce, for each sweep, a pair of time-spaced pulses whose relative amplitude, or difference in amplitudes, is an accurate measure of the sense and extent of the deviation of the oscillator, or offset, frequency from the second-named transition frequency of the gas.

Further in accordance with the invention, for automatic control of the oscillator frequency, a control voltage of variable sense and magnitude is derived from the microwave absorptions at the two resonant modulation frequencies. In the preferred methods and systems, the paired pulses produced for each sweep of the microwave frequency are impressed upon a comparator network whose output voltage, usable for frequency-control of the oscillator, is of polarity dependent upon the sense of the frequency-deviation and of magnitude dependent upon the extent of the frequency deviation.

More particularly, in some forms of the invention the comparator network is gated by one of the paired pulses, or by a pulse derived therefrom, whereas in other forms of the invention, the sweep interval is controlled in avoidance of need for gating.

Further in accordance with the invention, the intensity of the applied radio-frequency field may be adjusted to vary, within small limits, the second transition frequency of the gas. For rigid control of the oscillator frequency, the intensity of the corresponding field applied to the gas should be stabilized at a preselected or adjusted magnitude.

The invention further resides in methods and systems of frequency measurement and control having the features hereinafter described and claimed.

For a more detailed understanding of the invention and for illustration of systems embodying it, reference is made to the accompanying drawings in which:

Figs. 1A, 1B and 2A–2F are explanatory figures referred to in discussion of underlying principles of the invention and of the operation of systems disclosed;

Figs. 3, 4 and 5 schematically illustrate systems of frequency measurement and control utilizing resonant modulation of a gas;

Fig. 8 is a block diagram of a modification of Fig. 5 which does not require gating of the pulse comparator;

Fig. 9 is a circuit diagram of components utilizable in the system of Fig. 8;

Figs. 10A–10I are explanatory figures referred to in discussion of Figs. 9 and 11; and Fig. 11 is a circuit diagram of a modification of Fig. 9.

Figure 7A:
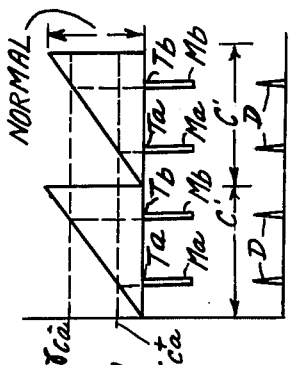
Figs. 7A–7C are explanatory figures referred to in discussion of Fig. 8.

In various copending applications, including Serial Nos. 4,497, filed January 27, 1948, Patent No. 2,702,351; 8,246, filed February 13, 1948, Patent No. 2,669,659; 6,975, filed February 7, 1948, Patent No. 2,609,564; 35,185, filed June 25, 1948, Patent No. 2,584,608; 135,857, filed December 30, 1949; 115,698, filed September 14, 1949, Patent No. 2,631,269; 29,836, filed May 28, 1948, now abandoned; and 122,988, filed October 22, 1949, Patent No. 2,560,365, there are described methods and systems for stabilizing oscillators in which a gas-absorption line is used as a frequency standard. In such arrangements, the stabilized oscillator is a microwave oscillator and generation of a stabilized lower frequency, as shown in some of the aforesaid applications, is obtainable only by indirect methods, as by recourse to frequency dividers. By the present invention, the frequency of a medium or low radio-frequency oscillator, such as those operating in the range of tens or hundreds of megacycles, may be directly controlled from a gas by utilization of the phenomenon of "resonant modulation."

To the extent here necessary, this phenomenon may be understood by reference to Figs. 1A, 1B and 2A–2D. In Fig. 1A there are shown three permitted energy states or levels ($W_a$, $W_b$, $W_c$, where $W_c > W_b > W_a$) of a gas molecule. For purposes of explanation, it is assumed, as is the case for OCS (carbonyl sulphide), that the transition frequency $\gamma_{ac}$ where $$\gamma_{ac} = \frac{W_c - W_a}{h}$$

lies in the microwave region, whereas a second transition frequency $\gamma_{ab}$ where $$\gamma_{ab} = \omega_0 = \frac{W_b - W_a}{h}$$

is a much lower frequency (about 40 megacycles for OCS). Also assume that $W_a \leftarrow \rightarrow W_c$ and $W_a \leftarrow \rightarrow W_b$ are both permitted transitions.

Upon application to the gas of a field having a frequency $\omega$ equal or close to the lower transition frequency $\gamma_{ab}$, the energy levels $W_a$, $W_b$ of Fig. 1A each split, as shown in Fig. 1B, to a pair of energy levels $$(W_b^+, W_b^-; W_a^+, W_a^-)$$

with the levels of each pair separated by the energy $h\gamma$ such that the paired microwave absorptions at frequencies $$\frac{W_c - W_a^+}{h}$$

and $$\frac{W_c - W_a^-}{h}$$

differ by a frequency which, for OCS, is of the order of a megacycle when the field intensity of $\omega$ is a few volts.

Upon sole application to the gas of a microwave field, the gas, as shown in Fig. 2A, exhibits selective absorption at the transition frequency $\gamma_{ac}$, it being understood the gas is at suitably low pressure, for example, of the order of $10^{-1}$ millimeters of mercury.

When both fields are concurrently applied, the $\gamma_{ac}$ line is split, as shown in Fig. 2B, Fig. 2C and Fig. 2D into two absorption lines at frequencies $$\gamma_{ac}^+ = \gamma_{ac} - \frac{\gamma}{2}$$

and $$\gamma_{ac}^- = \gamma_{ac} + \frac{\gamma}{2}$$

The microwave field should be relatively weak so that the probability of $W_c \rightleftarrows W_a$ transitions is less than the probability of $W_b \rightleftarrows W_a$ transitions.

The relative intensity of these two lines, or components of the origial $\gamma_{ac}$ line, as will be shown later in Equations 14 and 15 may be expressed as $$\frac{I_a^+ \to c}{I_a^- \to c} = \frac{h^2(\gamma + \omega_0 - \omega)^2}{|V_{ab}|^2}$$

where $$V = \vec{\mu} \cdot \vec{E}$$

$\mu$ = permanent dipole moment of the molecule
$E$ = electric field intensity

The significant relations, shown in Figs. 2B–2D is that (for $\omega \approx \gamma_{ac}$):

When $\omega = \omega_0$ then $\dfrac{I_a^+ \to c}{I_a^- \to c} = 1$

When $\omega < \omega_0$ then $\dfrac{I_a^+ \to c}{I_a^- \to c} > 1$

When $\omega > \omega_0$ then $\dfrac{I_a^+ \to c}{I_a^- \to c} < 1$

In short, the relative intensity, or the difference between intensities, of the two absorption lines produced by resonant modulation of the $\gamma_{ac}$ line depends, in both sense and magnitude, upon whether the frequency of the applied submicrowave field is greater than, equal to, or less than the lower transition frequency $\gamma_{ab}$ of the gas.

In like manner, when there is applied to the gas both microwave energy having the microwave transition frequency $\gamma_{bc}$ $$\left(\text{where } \gamma_{bc} = \frac{W_c - W_b}{h}\right)$$

and lower frequency energy of frequency at or near the lower transition frequency $\gamma_{ab}$, the $\gamma_{bc}$ line is split into two absorption lines having frequencies respectively somewhat above and below microwave frequency $\gamma_{bc}$ and whose relative intensity, or intensity difference, is a direct measure of the difference between the lower transition frequency $\gamma_{ab}$ and the frequency of the applied lower frequency field.

For the first report of the phenomena of "resonant modulation," reference may be had to discussions thereof in the June 1949 and September 1949 issues of the Quarterly Reports by Autler and Townes of Columbia Radiation Laboratory. If a medium frequency R.-F. field is applied to the gas while the microwave absorption line $$\gamma_{ac} = \frac{W_c - W_a}{h}$$

is being observed, the microwave line splits when the medium frequency field is made to have a frequency $\gamma_{ab}$. The amount of splitting depends upon the magnitude of the medium frequency field and the relative intensities of the two components into which the line splits depends on the deviation from resonant frequency and, in addition, the sense of the relative intensities depends upon whether the frequency of the medium frequency field, $\omega$, is greater than or less than the resonant frequency $$\omega_0 = \gamma_{ab} = \frac{W_b - W_a}{h}$$

Hence, a medium frequency $\omega_0$ has been defined by molecular properties and with great accuracy and may be used as a standard for frequency control purposes. The following discussion of Autler and Townes may be used to explain the "resonant modulation" effect.

Very briefly, and following Autler and Townes, assume that a molecule is known initially to be in one of two energy states $W_b$ or $W_a$ and $W_b > W_a$. The problem is to calculate the probability amplitude as a function of time when medium frequency radiation near $$\frac{W_b - W_a}{h}$$

is present. Assume $$\psi(x,y,z,t) = C_a(t)U_a(x,y,z) + C_b(t)U_b(x,y,z) \quad (1)$$

$$H = H^0 + V \cos \omega t \quad H^0 U_a = W_a U_a \quad H^0 U_b = W_b U_b \quad (2)$$

where $$V = \vec{\mu} \cdot \vec{E}$$

and $H^0$ includes all internal interactions of the molecule, $\mu$ is the permanent dipole moment of the molecule and $\vec{E}$ is the electric intensity. Inserting (1) and (2) into the Schroedinger equation $$ih\dot{\psi} = H\psi \quad (3)$$

gives $$ih\dot{C}_a = (W_a + V_{aa} \cos \omega t) C_a + C_b V_{ab} \cos \omega t \quad (4)$$

$$ih\dot{C}_b = (W_b + V_{bb} \cos \omega t) C_b + C_a V_{ba} \cos \omega t \quad (5)$$

$$V_{ab} = \langle a | \vec{\mu} \cdot \vec{E} | b \rangle, \text{ etc.}$$

and $V_{aa}$, $V_{bb}$ are assumed small compared to $W_b - W_a$ and are neglected giving $$ih\dot{C}_a = W_a C_a + C_b V_{ab} \cos \omega t \quad (6)$$

$$ih\dot{C}_b = W_b C_b + C_a V_{ba} \cos \omega t \quad (7)$$

The desired solution of (6), (7) is of the form $$C_a = \sum_{n=-\infty}^{+\infty} A_n e^{i(\lambda - n\omega)t} \quad (8)$$

$$C_b = \sum_{n=-\infty}^{+\infty} \beta_n e^{i(\lambda - n\omega)t} \quad (9)$$

A considerable amount of manipulation leads to the result $$C_a = e^{i\left(-\frac{W_b}{h} + \frac{\omega - \omega_0}{2}\right)t} \left[ \frac{K(K - \beta e^{i\phi})}{\sqrt{2}(K^2 + \beta^2)} e^{i\frac{\gamma}{2}t} + \frac{\beta(\beta + K e^{i\phi})}{\sqrt{2}K^2 + \beta^2} e^{-i\frac{\gamma}{2}t} \right] \quad (10)$$

$$C_b = e^{i\left(-\frac{W_a}{h} - \frac{\omega - \omega_0}{2}\right)t} \left[ -\frac{\beta(K - \beta e^{i\phi})}{\sqrt{2}(K^2 + \beta^2)} e^{i\frac{\gamma}{2}t} + \frac{K(\beta + K e^{i\phi})}{\sqrt{2}(K^2 + \beta^2)} e^{-i\frac{\gamma}{2}t} \right] \quad (11)$$

after also making use of the normalizing probability state condition $|C_a|^2+|C_b|^2=1$ and the initial condition $$C_b = C_a e^{i\phi} \text{ at } t=0$$

In the above $$\omega_0 = \frac{W_b - W_a}{h}, \quad \gamma = \sqrt{|V_{ab}|^2 + (\omega_0-\omega)^2}, \quad \beta = \frac{V_{ab}}{2}, \quad \bar{\beta} = \frac{V_{ba}}{2}$$

Making use of the following simplifying notation $$\left.\begin{aligned}\frac{K(K-\beta e^{i\phi})}{\sqrt{2}(K^2+\beta^2)} &= C_a^+ \\ \frac{\beta(\beta+Ke^{i\phi})}{\sqrt{2}(K^2+\beta^2)} &= C_a^- \\ \frac{\beta(K-\beta e^{i\phi})}{\sqrt{2}(K^2+\beta^2)} &= C_b^+ \\ \frac{K(\beta+Ke^{i\phi})}{\sqrt{2}(K^2+\beta^2)} &= C_b^- \end{aligned}\right\} \quad (12)$$

The result below is obtained $$\psi = U_a e^{i\left(-\frac{W_a}{h}+\frac{\omega-\omega_0}{2}\right)t}\left[C_a^+ e^{i\frac{\gamma}{2}t} + C_a^- e^{-i\frac{\gamma}{2}t}\right] + U_b e^{i\left(\frac{W_a}{h}+\frac{\omega-\omega_0}{2}\right)t}\left[C_b^+ e^{i\frac{\gamma}{2}t} + C_b^- e^{-i\frac{\gamma}{2}t}\right] \quad (13)$$

From (13) it is apparent that for $\omega \approx \omega_0$ the energy levels $W_a$ and $W_b$ each split into a pair of levels which are separated by the energy $h\gamma$. For OCS when the applied medium frequency field is a few volts, $\gamma$ is of the order of a megacycle.

Now transitions to the third state $W_c$ are brought into the picture. A normal microwave line frequency $$\frac{W_c - W_a}{h}$$

exists in the absence of the medium frequency field. Also if the microwave field is made sufficiently small the $W_c \rightleftarrows W_a$ transitions are much less probable than the $W_b \rightleftarrows W_a$ transitions when the medium frequency field is applied. Also when this medium frequency field is applied, the $$\frac{W_c - W_a}{h}$$

frequency absorption line is split into two lines of frequencies $$\frac{W_c - W_a^+}{h}$$

and $$\frac{W_c - W_a^-}{h}$$

The relative intensities of these lines are given by $$\frac{I_a^+ \rightarrow c}{I_a^- \rightarrow c} = \frac{|C_a^+|^2}{|C_a^-|^2} = \frac{K^2}{\beta^2} = \frac{h^2(\gamma+\omega_0-\omega)^2}{|V_{ab}|^2} \quad (14)$$

after taking into account the fact that $\phi$, the relative phase of $C_a$ and $C_b$ is random, and averaging over $\phi$.

The important result is

When
$$\omega = \omega_0 I_a^+ \rightarrow c = I_a^- \rightarrow c$$
When
$$\omega < \omega_0 I_a^+ \rightarrow c > I_a^- \rightarrow c$$
When
$$\omega > \omega_0 I_a^+ \rightarrow c < I_a^- \rightarrow c$$

In similar fashion $$\frac{I_b^+ \rightarrow c}{I_b^- \rightarrow c} = \frac{\beta^2}{K^2}$$

It is possible to determine the dependence of the relative intensities of the split lines from the defining expression for $\gamma$ and from (14) as follows:

$$\gamma = \sqrt{\frac{|V_{ab}|^2}{h^2} + (\omega_0-\omega)^2}$$

and let $\omega$ vary as $$\omega = \omega_0(1+\delta) \quad (16)$$

so that $$\gamma = \frac{V_{ab}}{e}\sqrt{1+\left(\frac{\omega_0 \delta}{\frac{V_{ab}}{h}}\right)^2} \quad (17)$$

Using (17) in (14)

$$\frac{I_a^+ \rightarrow c}{I_a^- \rightarrow c} = \frac{h^2}{|V_{ab}|^2}\cdot\left[\frac{V_{ab}}{h}\sqrt{1+\left(\frac{\omega_0\delta}{\frac{V_{ab}}{h}}\right)^2}-\omega_0\delta\right]^2 \simeq \left[1+\left(\frac{\omega_0\delta}{\frac{V_{ab}}{h}}\right)^2\right]\left[1-\frac{2\omega_0\delta}{\frac{V_{ab}}{h}\left[1+\frac{1}{2}\left(\frac{\omega_0\delta}{\frac{V_{ab}}{h}}\right)^2\right]}\right] \quad (18)$$

The approximation involved in arriving at the last part of (18) is obviously slight since, for OCS and a medium frequency field of a few volts, $\gamma \approx 10^6$, the main interest lies in the frequency region $\omega \approx \omega_0$, which means $\delta$ is very small compared to unity, and $\omega_0 \approx 40 \times 10^6$.

Using these numerical values in (18)

$$\frac{I_a^+ \rightarrow c}{I_a^- \rightarrow c} \simeq (1+1600\delta^2)\left(1-\frac{80\delta}{1+800\delta^2}\right)$$

which, for $\delta \ll 1$ is $$\frac{I_a^+ \rightarrow c}{I_a^- \rightarrow c} \simeq (1-80\delta) \quad (19)$$

The important result of (19) is that, to use the principle of resonant modulation for frequency control, it is only necessary to compare the relative intensities of a pair of split absorption lines to a precision much less (about 80 times for OCS) than the desired precision of frequency control. The output of the intensity comparison circuit (which in a simple form can be merely a pair of gated peak rectifiers) is used as the sense "error voltage" to correct the frequency of the medium frequency oscillator.

There are now described various generically similar but specifically different methods and systems for utilizing the above described phenomenon "resonant modulation" for control of a medium frequency oscillator.

Referring to Fig. 3, the closed chamber 10, which may be a section of waveguide, confines, at suitably low pressure, a body of gas, such as OCS, having at least three permitted energy levels or states of its molecule. The gas is excited at one of its microwave transition frequencies, for example, $\gamma_{ac}$, by energy fed thereto through a suitable transmission line, of the waveguide or concentric line type, from a microwave oscillator 11. Cell 10 has end windows of quartz or the like, transparent to the microwave energy. The gas is also subjected to a field of frequency corresponding with or offset by a predetermined amount from, a second of its transition frequencies, for example, $\gamma_{ab}$. Such field energy is supplied from oscillator 12, or by an amplifier (or frequency-multiplier) interposed between that oscillator and the field-producing electrodes 13, or equivalent means. The offset frequency may be provided by deriving a selected beat frequency from the stabilized oscillator 12.

The concurrent excitation of the gas by the oscillators 11 and 12 splits the normal absorption line $\gamma_{ac}$ (Fig. 2A) into two absorption lines $$\gamma_{ac}^+ \text{ and } \gamma_{ac}^-$$

(Figs. 2B, 2C, 2D), so that the gas now exhibits selective absorption at two frequencies somewhat higher and lower respectively than the microwave transition frequency.

The output of the oscillator 11 is modulated, as by beat-oscillator 25, to produce two sidebands of microwave energy having frequencies respectively equal to the microwave oscillator frequency $F_0$ plus and minus the beat oscillator frequency $F_3$. The frequency $F_3$ of the beat oscillator is so chosen that the upper and lower sideband frequencies correspond with the split absorption line frequencies $$\gamma_{ac}^+ \text{ and } \gamma_{ac}^-$$

Therefore, if the frequency of oscillator 12 exactly corresponds with the lower transition frequency $\gamma_{ab}$ of the gas, there is equal absorption of the sidebands as shown by curves A, B of Fig. 2B and for the system of Fig. 3 this is a continuous, rather than a cyclical or sampling, situation whereas if the frequency of oscillator 12 is higher or lower than the transition frequency $\gamma_{ab}$, the absorptions of the sidebands are unequal, generally as shown by curves A, B of Figs. 2C and 2D.

To determine the relative absorption at the two sideband frequencies, the microwave energy unabsorbed by the gas is transmitted to two microwave filters 14A and 14B respectively tuned to the frequencies $(F_0+F_3)$ and $(F_0-F_3)$, as shown by the curves X and Z of Fig. 2E. The output energies $Ma$, $Mb$ of the filters are demodulated as by rectifiers 15A and 15B having a common output network 16. The rectifiers are so poled that the output of the network 16, as measured by a sensitive voltmeter 17, is proportional to the differential output of the rectifiers as integrated by network 16. The filters 14A, 14B may be continuously in circuit, as shown, or may be alternately switched in circuit at suitably high repetition rate.

An attenuator may be interposed between one or the other of the filters 14A and 14B and chamber 10 so that the output of the network 16 is zero when the frequency $F_2$ of oscillator 12 corresponds with the transition frequency $\gamma_{ab}$ of the gas. Upon deviation of the frequency of oscillator 12 from the transition frequency $\gamma_{ab}$, the output of one of the rectifiers increases and the output of the other simultaneously decreases, the sense and magnitude of the output voltage of network 16 corresponding with the sense and extent of the frequency deviation. For manual control of the frequency of oscillator 12, an operator observing output meter 17 may readjust the tuning control 18 of the oscillator 12 to obtain a null indication. For automatic control of the frequency of oscillator 12, the output of the network 16 may be applied, as by line 19, to a reactance tube or other known arrangement for control of oscillator frequency.

The arrangement of Fig. 3 may also be used for measurement or control of the frequency of oscillator 12 by having one of the filters 14A or 14B tuned to frequency $\gamma_{ac}$ and the other filter tuned to either of the sideband frequencies $$(\gamma_{ac}^+ \text{ or } \gamma_{ac}^-$$

provided that suitable molecules exist in which, when level splitting occurs upon application of a field at frequencies $\omega \rightleftharpoons \gamma_{ab}$, a residue energy level remains at $W_a$ in addition to the new levels $W_a^+$, $W_a^-$.

Figure 4:
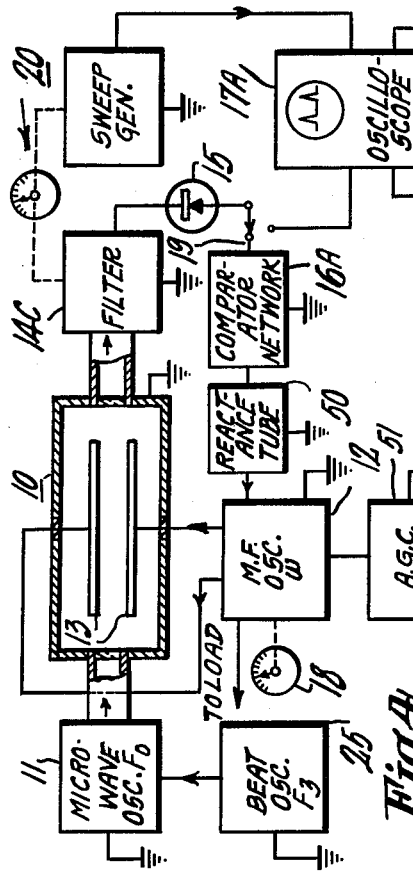

Referring to Fig. 4 in which, as in all subsequent figures, elements common to Fig. 3 are identified by the same reference characters, the microwave energy unabsorbed by the gas in chamber 10 is repeatedly scanned by a tunable filter 14C. For example, a tuning plunger or diaphragm of filter 14C may be reciprocated or flexed by a sweep generator or mechanism 20. The resonant frequency of the filter 14C is thus repeatedly swept over a range including the resonant modulation frequencies $$\gamma_{ac}^+ \text{ and } \gamma_{ac}^-$$

so that the output of filter 14C, as demodulated by rectifier 15 and viewed by an oscilloscope 17A, consists of a pair of pulses $Ma$, $Mb$ for each sweep cycle of the generator 20 (Fig. 2F). The horizontal sweep of the oscilloscope may be synchronized in known manner with the sweep-frequency of generator 20.

When the frequency of oscillator 12 corresponds with the transition frequency $\gamma_{ab}$ of the gas, the two pulses or pips are of equal amplitude because of the equal absorptions, Fig. 2B whereas when the frequency of oscillator 12 is above or below the transition frequency $\gamma_{ab}$, the pips are of unequal heights because of the unequal absorptions, Figs. 2C and 2D. Thus, an operator observing the oscilloscope screen may readjust the tuning control 18 of oscillator 12 to maintain equality of the observed pulse amplitudes. For automatic control of the frequency of oscillator 12, the paired pulse output of the demodulator 15 may be impressed upon a suitable comparator network 16A, specific forms of which are later discussed in detail, to produce a frequency-control voltage whose sense and magnitude depends upon the sense and extent of the frequency-deviation of oscillator 12.

Though the arrangements of Figs. 3 and 4 have the advantage of simplicity, they have the disadvantages that rigid stabilization of oscillator 12 requires that the frequencies of the microwave oscillator 11, of beat oscillator 25 and of the fixed tuned filters 14A and 14B of Fig. 3 be held constant because variation of any of these frequencies results in a differential change in the amplitude of the absorption lines at frequencies $$\gamma_{ac}^+ \text{ and } \gamma_{ac}^-$$

Figure 5:
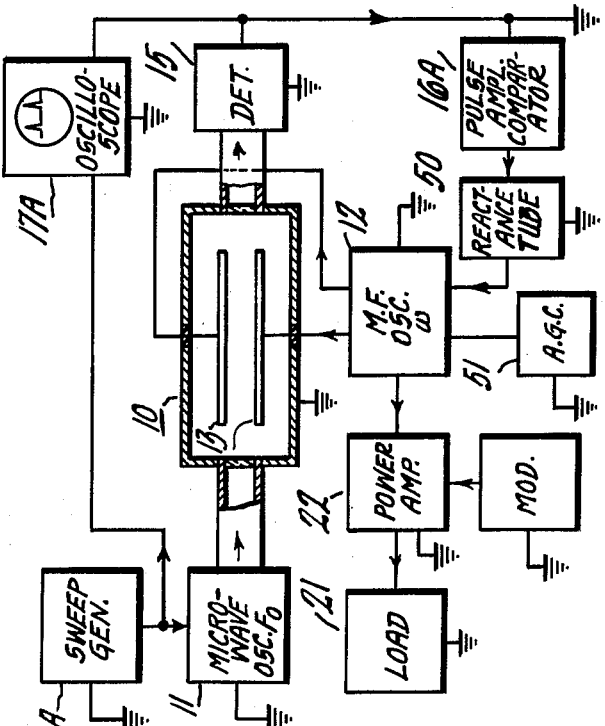

These disadvantages are overcome by the arrangement shown in Fig. 5 in which the frequency of the microwave oscillator 11 is repeatedly swept through a range including the resonant modulation frequencies $$\gamma_{ac}^+ \text{ and } \gamma_{ac}^-$$

Assuming the sweep generator 20A produces a sawtooth output wave, the frequency of microwave oscillator 11 periodically sweeps a range including the resonant modulation frequencies as graphically illustrated in Fig. 2F.

When the output of the oscillator 12 is modulated, at audio or video frequencies, for communication or broadcast purposes, the period P of the sweep generator should be selected so as to be outside of the range of the modulation frequencies. For such uses in this or other systems disclosed, in a preferred arrangement, the output of the oscillator 12 is supplied to an antenna or other load 21 after amplification by a power amplifier 22. Since normal modulation is applied in an amplifier stage following the oscillator 12, none of these modulation terms appear in the frequency control circuits.

With this arrangement, for each sweep cycle of generator 20A, the output of the demodulator 15 is a pair of spaced pulses $Ma$, $Mb$ which are of equal amplitude when the frequency of oscillator 12 corresponds with the transition frequency $\gamma_{ab}$ of the gas because under such circumstance the energy absorptions are equal, Fig. 2B. Upon deviation of the frequency of oscillator 12 from the transition frequency $\gamma_{ab}$, one or the other of the paired pulses is of greater amplitude depending upon the sense of the deviation. The relative intensity of the pulses is substantially proportional to the extent of the frequency deviation. Such unequality of the pulse amplitudes exists because of the unequal absorptions at frequencies $$\gamma_{ac}^+, \gamma_{ac}^-$$

as explained in discussion of Figs. 2C and 2D.

The paired pulse output of the demodulator 15 is impressed upon the comparator 16A which accordingly produces a unidirectional frequency-control voltage which varies in sense and magnitude with the frequency-deviation of oscillator 12.

Figure 6:
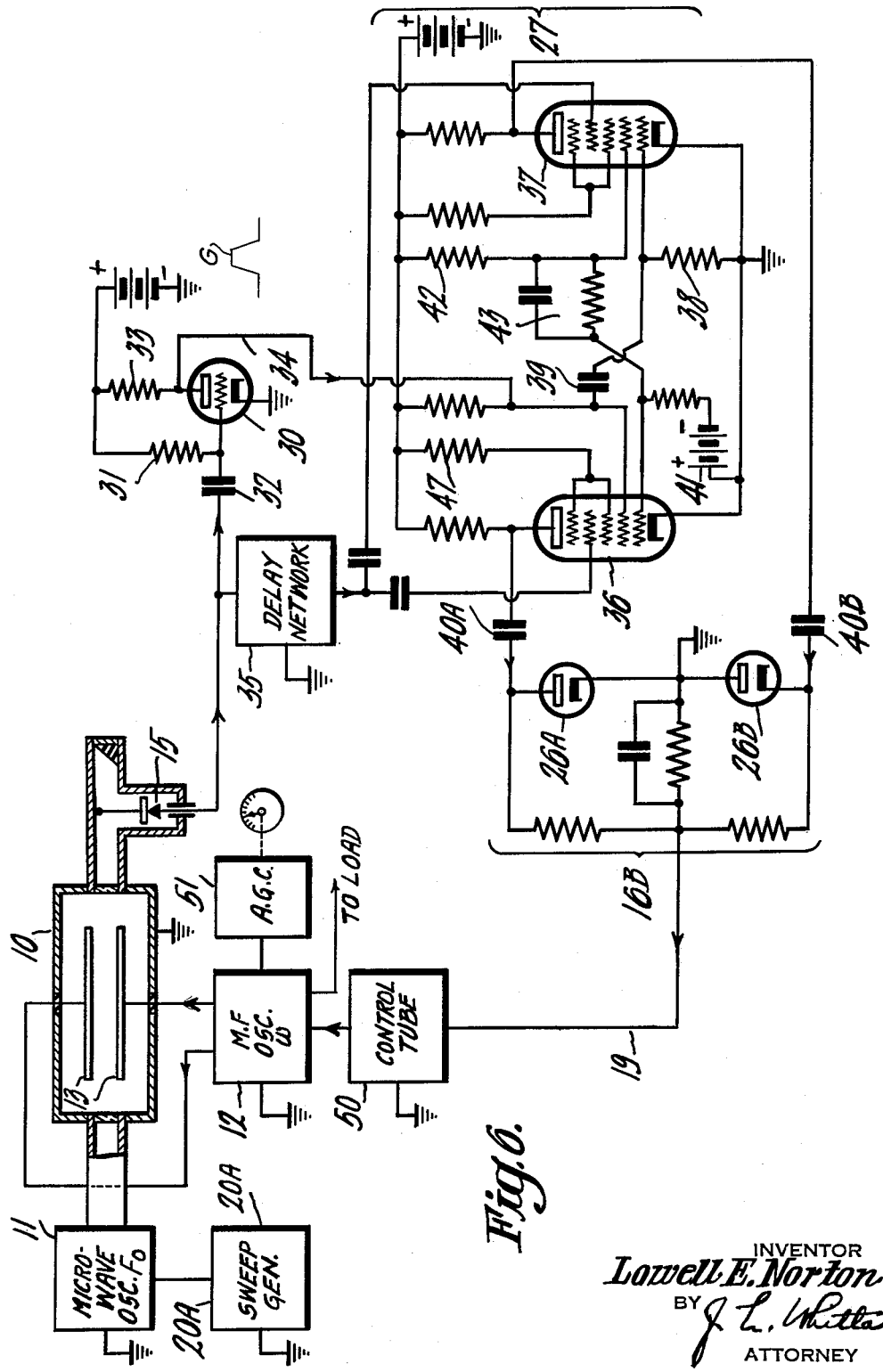
Fig. 6 is a modification of Fig. 5 in which the pulse comparator is gated.

In the particular automatic frequency control arrangement shown in Fig. 6, the comparison of the intensities of the paired output pulses of rectifier 15 is effected by two peak rectifiers 26A and 26B which are gated respectively to operate on the first and second pulses of the successive pairs thereof. The gating circuit should be controlled from one of the paired pulses, or by a pulse derived from one of them, to avoid drift of the gating from the pulses. This may be accomplished in many ways: in the simple arrangement shown in Fig. 6, the output of the rectifier 15 is applied to the control grid of tube 30. An amplifier may be interposed between rectifier 15 and tube 30 if desirable or necessary. Tube 30 is initially or normally conducting, so that the potential of its anode is initially less positive than the anode supply potential by amount corresponding with the voltage drop in the anode resistor 33. The control grid of tube 30 is connected to the positive terminal of the anode supply source through a resistance 31 and is therefore slightly positive with respect to its cathode.

Under these conditions, when the first of the two positive pulses, M$a$, M$b$ occurs, the reactance of the grid condenser 32, for the wave shape involved, is large compared to the grid-cathode resistance and condenser 32 and resistance 31 therefore serve as a differentiating circuit. The grid side of condenser 32 becomes negatively charged and tube 30 cuts off. The cutoff time is controlled by the time-constant of the network 31, 32 and is so preselected or adjusted that the tube 30 remains cut off, or nonconductive, until after occurrence of the second (M$b$) of the paired absorption envelopes or pulses. The relatively long output pulse G of tube 30 is applied, as by line 34, to operate the gate circuit for the diodes 26A, 26B, as more fully later described.

The paired pulse output of rectifier 15 is also passed through a delay network 35 provided to permit the gating control tube 30 to open the gate slightly before the paired pulses or envelopes occur in the comparison circuit 16B. The output of the delay network 35 consists of or contains the paired pulse envelopes.

In the particular form shown in Fig. 6, the gating circuit 27 comprises tubes 36 and 37 interconnected in known manner to form a multivibrator whose switching or "On-Off" operation is controlled by the output gating pulses G from tube 30. Specifically, a fixed bias battery 41, or equivalent, is connected between the cathode and No. 1 grid of tube 36, and that grid is connected through a resistance-capacity network 43 to the No. 2 grid of tube 37, which in turn is connected to the positive terminal of the anode supply through a resistor 42. The No. 1 grid of tube 37 is connected to the cathode of that tube through a biasing resistor 38 which is coupled to the No. 2 grid of tube 36 by condenser 39. The No. 3 and No. 5 grids of the tubes are connected to the positive terminal of the anode supply through resistors 47, 47.

Tube 37 is initially or normally conducting. A gating pulse from tube 30 switches tube 36 "on" and tube 37 "off" just before the delayed pulses are impressed upon the No. 4 grids of the two tubes. The first pulse of each pair therefore appears in the anode circuit of tube 36 and is impressed through condenser 40A upon the diode 26A. The time constant of the resistance-capacitance network 38, 39 is selected or pre-adjusted so that tube 36 cuts off and tube 37 returns to conductive condition shortly after passage of the first pulse of the pair but before arrival of the second pulse. The second M$b$ of the paired pulses or envelopes therefore appears in the anode circuit of tube 37 and is impressed through condenser 40B upon the other diode 26B.

The unidirectional output voltage of the comparator network 16B including the differentially connected diodes 26A, 26B, is zero when the paired pulses M$a$, M$b$ are of equal amplitude. As above explained, this condition exists when there is equal absorption of the microwave energy at the resonant modulation frequencies $$\gamma_{ao}^+ \text{ and } \gamma_{ao}^-$$

Also, as above explained in connection with Figs. 2B—2D, such equality of the absorptions exists when and only when the frequency of oscillator 12 is equal to the lower transition frequency $\gamma_{ab}$ of the gas. When the frequency of oscillator 12 drifts above or below the lower transition frequency $\gamma_{ab}$, the output voltage of the amplitude comparison network 16B is of corresponding sense and polarity. Thus, the output voltage of comparator 16B is an error voltage which may be applied in manner known per se, as through a reactance or control tube system 50, automatically to stabilize the frequency of oscillator 12.

With this arrangement, Fig. 6, like those subsequently described, there is no need for stabilization of the frequency of the microwave oscillator 11 as the sweep range may be initially selected to insure continued sweeping of the two absorption lines $$\gamma_{ao}^+ \text{ and } \gamma_{ao}^-$$

despite drift of the mean frequency of oscillator 11. This arrangement also avoids the need for use of tuned microwave circuits, such as 14A and 14B of Fig. 3, which present difficult problems of construction and operation for maintenance of a stable sharp resonant frequency.

Within narrow limits, the frequency at which oscillator 12 is stabilized in any of the systems herein described may be varied by adjustment of the intensity of the oscillator-frequency field applied by electrodes 13, or equivalent, to the gas in cell 10. Preferably, an automatic gain control 51, of any suitable type, should be effectively connected to oscillator 12 to maintain the lower frequency field applied to the gas of intensity which is constant at the preselected or adjusted magnitude. Adjustment of the intensity may be accomplished by adjusting the control level of the automatic gain control 51.

Modifications of the system of Fig. 5 which do not require gating may use pulse comparison arrangements of the types shown in Figs. 9 and 11 and more fully described and specifically claimed in my copending application, Serial Number 198,541 filed December 1, 1950, Patent No. 2,695,361. An automatic frequency control system or method which does not require gating and exemplary of the aforesaid arrangements is shown in block diagram in Fig. 8, the circuit components and connections of two forms thereof being shown in more detail in Figs. 9 and 11 and later herein specifically described.

In the system shown in Fig. 8, the range of frequency swept by the microwave oscillator 11 is automatically controlled to maintain equality of the time-spacing between the successive pulses produced by demodulation of the microwave energy unabsorbed by the gas in cell 10; that is, as shown in Fig. 7A, the time interval T$a$—T$b$ between the paired pulses M$a$, M$b$ for each absorption or sweep interval P is the same as the time interval T$b$—T$a$ between the second pulse M$b$ of one pair and the first pulse M$a$ of the second pair. Upon any deviation from this equal time relationship, the sweep range or frequency interval of the oscillator is automatically increased or decreased, as need be, to restore the equal time spacing of the pulses which obviates, as later explained, the need for gating of the pulse comparator 16C.

The repetition frequency $f_1$ of the sweep generator 20A for the microwave oscillator 11 is controlled by a multivibrator 60, in turn triggered or controlled by a multivibrator 61 operating at twice that frequency. The double frequency output pulses D of multivibrator 61 are also impressed upon one input circuit of a coincidence detector 62 upon whose second input circuit is impressed the paired absorption line pulses M of demodulator 15. The output pulses D of multivibrator 61 are always equally spaced in time and serve as a time-spacing standard. The output pulses of demodulator 15 are also equally spaced so long as there exists that relation, shown in Fig. 7A, between the resonant modulation lines $$\gamma_{ao}^+, \gamma_{ao}^-$$

of the gas and the swept microwave frequency. Under such circumstance, the corresponding successive pulses D and M of the two series respectively impressed upon the input circuits of coincidence detector 62 occur simultaneously and the output of detector 62 is zero. When, however, the spacing between the paired pulses M$a$, M$b$ in the output circuit of demodulator 15 is greater (Fig. 7B) or less (Fig. 7C) than the spacing between the second pulse M$b$ of a pair and the first pulse M$a$ of the next pair, the coincidence detector 62 produces across network 100 an output voltage of polarity dependent upon which spacing is the greater and of magnitude dependent upon the magnitude of the difference between the spacings.

Figure 7B:
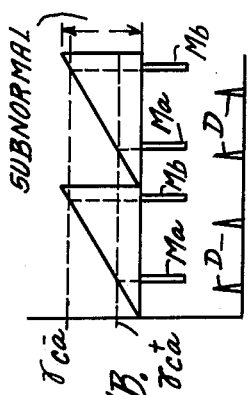
Figure 7C:
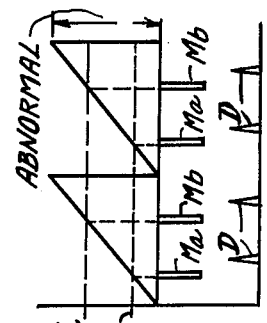

Specifically, when the spacing between the paired pulses from demodulator 15 is greater than the time-spacing between the successive pairs thereof, the output voltage of detector 62, as applied by line or channel 53 to the amplifier 63 for the sweep generator 20A, is of proper sense to restore the amplifier gain, so to increase the frequency interval swept by the microwave generator 11 from the subnormal range of Fig. 7B toward the normal interval or range shown in Fig. 7A. Conversely, when the spacing between the paired pulses is greater than the spacing of pulses D, the polarity of the output voltage of detector 62 is of reverse sign to decrease the gain of sweep amplifier 63, so to decrease the sweep interval from the abnormal range of Fig. 7C toward the normal interval of Fig. 7A.

In short, the coincidence detector 62 controls the sweep interval of the microwave energy so that the paired pulses M$a$, M$b$ occurring in the successive sweeps have the same time space as exists between the successive pairs. The situation here is a special case of the more general one, discussed more fully in my aforesaid copending application Serial No. 198,541 filed December 1, 1950, Patent No. 2,695,361 in which it is necessary to determine the magnitude-equality condition of paired non-coincidence events which occur cyclically and to know the sense and magnitude of any departure from equality.

Assuming that the pulses M of duration $\delta$ are flat-topped and rectangular, as they may be by utilization of a suitable shaping network, not shown, the Fourier series which represents this recurrent phenomenon may be expressed as:

$$e = E_0 + A_1 \sin B + A_2 \sin 2B \ldots + A_n \sin nB + D_1 \cos B + D_2 \cos 2B + \ldots + D_n \cos nB \quad (20)$$

or $$e = E_0 + F_1 \cos (B + \alpha_1) + F_2 \cos (2B + \alpha_2) + \ldots F_n \cos (nB + \alpha_n) \quad (21)$$

where B is the fundamental frequency corresponding with period $Ta - Tb$ and the phase angle $\alpha$ is a function of the magnitudes and duration of the pulses.

The coefficients of the fundamental terms of Equation 3 are as follows:

$$E_0 = \frac{\delta}{4\pi}(a+b) \quad (22)$$

where $\delta$ = pulse duration $a, b$ = pulse amplitudes $$A_1 = \frac{-\left(\cos \frac{\delta}{2} - 1\right)(a-b)}{\pi} \quad (24)$$

$$D_1 = \frac{\sin \frac{\delta}{2}(a+b)}{\pi} \quad (24)$$

from which the coefficient for the term of frequency $f_1$ is $$F_1 = \sqrt{\left[\frac{-\left(\cos \frac{\delta}{2} - 1\right)(a-b)}{\pi}\right]^2 + \left[\frac{\sin \frac{\delta}{2}(a+b)}{\pi}\right]^2} \quad (25)$$

and $$\alpha_1 = \tan^{-1}\left[\frac{\left(\cos \frac{\delta}{2} - 1\right)(a-b)}{\sin \frac{\delta}{2}(a+b)}\right] \quad (26)$$

Now expressing the magnitude of pulse ($b$) in terms of pulse ($a$)

$$b = a(1+\Delta) \quad (27)$$

where $\Delta$ = incremental difference.

Therefore, the tangent of the phase angle $\alpha_1$ is $$\tan \alpha_1 = \left(\frac{\cos \frac{\delta}{2} - 1}{\sin \frac{\delta}{2}}\right)\left(\frac{\Delta}{2+\Delta}\right) \quad (28)$$

which, for cases where $b$ is not greatly different from $a$ and $\Delta$ is much less than unity, gives, to close approximation $$\tan \alpha_1 \cong -\left(\frac{\cos \frac{\delta}{2} - 1}{\sin \frac{\delta}{2}}\right)\left(\frac{\Delta}{2}\right) \quad (29)$$

The significant relation utilized in that species in Fig. 8 exemplified by Fig. 9 is that the tangent of the phase angle $\alpha_1$ varies as $\Delta$, the difference between the amplitude of the paired pulses. For small differences between these amplitudes (the condition maintained by the automatic frequency control), the angle $\alpha_1$ and its tangent are closely equal to each other so that the phase angle $\alpha_1$ is itself a direct measure of the difference in amplitude of the paired resonant modulation pulses provided the intervals $Ta-Tb$ and $Tb-Ta$ are maintained substantially equal, which condition is closely controlled by the coincidence detector 62.

For pulse shapes which are other than flat-topped and rectangular, it is only necessary, as will be understood by those skilled in the art, to use the corresponding Fourier series to determine the proper coefficients.

Referring now specifically to Fig. 9, since the time-spacing of the absorption-line pulses M is maintained constant, in accordance with the foregoing, by the coincidence detector 62A, the difference in amplitude of the paired pulses M$a$, M$b$ can be measured by measuring the phase difference between the fundamental Fourier term derived from the paired pulses and the fundamental Fourier term derived from the time standard pulses corresponding with or derived from the sweep frequency all at rate $2f_1$. The amplitude comparator of this species of the invention may therefore be any suitable type of phase-comparator. Specifically, as shown in Fig. 9, the comparator 16D may comprise a rectifier network, including diodes 64A–64D, or equivalent, having input terminals 65, 66 upon which is impressed, through filter 67, the proper frequency components of the pulse output of demodulator 15. The filter 67 favors passage of the fundamental frequency term of Equation 3 at frequency $2f_1$ which is twice the repetition frequency of sweep oscillator 20B and attenuates or excludes passage of the higher-order frequency terms: the filter is also preferably of type which produces a substantially sinusoidal output waveform. Upon the other pair of input terminals 68, 69 of comparator 16D is impressed, through filter 70, the output of the double-frequency multivibrator 61A. This filter selectively passes the fundamental frequency of the multivibrator pulses and suppresses or excludes the higher order frequencies.

When the inputs to the comparator 16D are in phase, which, as above explained, occurs only when the successive resonant-modulation pulses M are of equal amplitude, the combined output of the rectifiers 64A–64D, as appearing across the integrating network 71, is zero. When the inputs are not in phase, as occurs when the paired absorption-line pulses, M$a$, M$b$ are of unequal amplitude, the polarity of the output voltage of comparator 16D depends upon which of the paired pulses is of the greater amplitude and the magnitude of the output voltage depends upon the difference between the pulse amplitudes. Thus, the output of the comparator 16D, as appearing across the terminals 69, 72 thereof, depends in polarity and magnitude upon the sense and extent of the frequency deviation of oscillator 12 from the lower transition frequency $\gamma_{ab}$ of the gas.

In the subsequent discussion of Figs. 9 and 11, it will be helpful to refer to Figs. 10A–10I which show the waveforms appearing at specified points of the system.

In the particular form shown in Fig. 9, the multivibrator 61A for supplying standard time-spacing pulses D to the coincidence detector 62A and to the comparator 16D comprises a pair of tubes 73, 74 whose anodes and control grids are cross-connected by coupling condensers 75, 75. The output of tube 74 provides the double sweep frequency ($2f_1$) pulses supplied through line or channel 76 to the comparator 16D. The output of tube 74, differentiated by the resistor-capacitor network 77, 78, is applied through line or channel 79 to one input circuit of the coincidence detector 62A. The positive pulses D are used as the time-spacing standard. If it is desired to use negative pulses then differentiation circuit 77, 78 must be connected to tube 73 instead of tube 74.

The second multivibrator 60A, in the particular form shown in Fig. 9, comprises a pair of tubes 80, 81 whose anodes and control grids are cross-connected by coupling condensers 82. The control grids of these tubes are also respectively coupled by capacitors 83, 83 to the anode circuit of a tube of multivibrator 61A. The output pulses of tube 81 of multivibrator 60A which are of sweep-repetition frequency $f_1$ are utilized to control the sweep generator 20B, which in the particular form shown in Fig. 9, comprises a thyratron tube 84 whose control grid is coupled by capacitor 85 to the anode circuit of tube 81 and whose anode or output circuit is suitably coupled to the sweep amplifier 63.

Though other types may be used, in the particular form shown in Fig. 9 the coincidence detector 62A comprises two pairs of diodes 85–86 with resistor-capacitor networks 90, 91 connecting the anodes of one pair and the cathodes of the other pair. The differentiated output of multivibrator 61A is applied to the input terminals 92, 93 of detector 62A to provide the standard time-space pulses, and to the other input terminals 94, 95 of the detector are applied the paired pulses M$a$, M$b$, collectively termed M, derived by demodulator 15 from the unabsorbed microwave energy of cell 10.

As coincidence detector 62A is of type requiring the pulse input M to be in push-pull, there is interposed between its input terminals 94–95 and demodulator 15, an inverter stage of known type including tube 96 having similar output resistors 97, 98 respectively disposed in its anode and cathode circuits. Thus, the unipolar absorption-line pulses M applied to the control grid of tube 96 are converted to push-pull pulses of opposite polarities for application through coupling condensers 99, 99 to the input terminals 94, 95 of the coincidence detector. As above generally explained in connection with Fig. 8, the output of the coincidence detector as appearing across the input terminals 92, 101, of Fig. 9 is applied to the sweep amplifier 63 to maintain the sweep interval of the microwave oscillator 11 of proper magnitude for equal time spacing of the successive absorption-line pulses (Fig. 7A), so to avoid need for gating of the pulse-comparator.

In the species of Fig. 8 shown in Fig. 11, the standard time-space pulses D applied to the coincidence detector 62A are derived, as in Fig. 9, by differentiating and rectifying the output of the multivibrator 61A. However, the standard time-space pulses E applied to the amplitude comparator are derived, not from the multivibrator 61A, as in Fig. 9, but by differentiating the output of multi-vibrator 60A, as by network 102, 103. As will appear from the following discussion, the filters 67 and 70 for applying standard time-space pulses to the pulse-comparator are tuned to the fundamental frequency of multivibrator 60A instead of to double this frequency from multivibrator 61A as was done in Fig. 9. The remainder of the circuits then operate on a variable amplitude constant phase basis, instead of on a variable phase basis. The end result is the same in that the output of the comparator is of polarity and magnitude dependent upon the difference in amplitude of the absorption-line pulses and therefore suited for control of the frequency of oscillator 12.

Assuming the recurrent absorption-line pulses to be flat-topped rectangular pulses and equally spaced in time, it can be shown that the coefficients $A_1$ and $D_1$ of Equation 4 where B is now the lowest frequency term associated with the period $(Ta-Ta)=(Ta-Tb)+(Tb-Ta)$ are $$A_1 = -\frac{1}{\pi}\left[a\left|\cos B\right|_0^{\frac{\delta}{2}} + b\left|\cos B\right|_{\pi-\frac{\delta}{2}}^{\pi+\frac{\delta}{2}} + a\left|\cos B\right|_{2\pi-\frac{\delta}{2}}^{2\pi}\right] = 0 \quad (30)$$

$$D_1 = \frac{2}{\pi}(a-b)\sin\frac{\delta}{2} \quad (31)$$

The coefficient $F_1$ is $$F_1 = \sqrt{A_1^2 + B_1^2} \quad (32)$$

but since $A_1 = 0$ (Equation 30)

$$F_1 = B_1$$

Also since $\alpha_1$ is the angle whose tangent is $$\left(-\frac{A_1}{B_1}\right)$$

and since $A_1 = 0$, then $\alpha_1 = 0$.

Hence the coefficient of the term associated with the frequency of period $(Ta-Ta)=(Ta-Tb)+(Tb-Ta)$ is $$F_1 = \left[\frac{2}{\pi}(a-b)\sin\frac{\delta}{2}\right] \quad (33)$$

The frequency of this term will be designated as $f_2$.

Therefore the magnitude of the lowest frequency term $f_2$ is uniquely determined by the difference in amplitude of the paired absorption line pulses and the algebraic sign of that term depends upon which of the paired pulses is the larger. This relationship is true providing the absorption interval or sweep range is maintained at that value for which, as in Fig. 7A, the observation interval $C^1 = 2(Ta-Tb)$. Such relationship is maintained by the coincidence detector 62A, as previously explained in discussion of Figs. 8 and 9. With the foregoing conditions established, the comparison of the amplitudes M$a$, M$b$ of the paired absorption-line pulses is effected without need for gating of the comparator network, as is required for the method and system exemplified by Fig. 6.

The filters 67 and 70 of Fig. 11, in accordance with the foregoing, favor the fundamental frequency $f_2$ and exclude the higher order frequencies. The fundamental output waveform is substantially sinusoidal.

The comparator 16E of Fig. 11 may be of any suitable type, such as shown by 16D in Fig. 9, or it may be of the type shown in Fig. 11 in which the standard time-space pulses from multivibrator 60A are applied in phase to the No. 3 grids of pentodes 104, 105. The absorption-line pulses from demodulator 15 are applied out of phase or in push-pull to the No. 1 grids of those tubes. The outputs of the two tubes are integrated by the resistance-capacity networks 108, 109 and the differential of those outputs, which is of polarity and magnitude dependent upon the relative amplitudes of the paired absorption-line pulses, may be applied to oscillator 12 to stabilize it at the frequency for which the relative amplitude of the pulses is unity, in which case—as repeatedly stated above—the oscillator frequency corresponds with the lower transition frequency $\gamma_{ab}$ of the gas in cell 10.

The system of Fig. 11, like that of Fig. 9, is operative for pulse waveforms other than flat top, rectangular pulses. In such case, the corresponding Fourier series is used.

From the foregoing general explanation of the invention and discussion of various methods and systems using or embodying it, it shall be understood that other specific methods and arrangements for utilization of the phenomenon of resonant modulation in frequency control are within the scope of the appended claims.

What is claimed is:

1. A method of utilizing the resonant modulation characteristic of a gas having at least three permitted energy states of its molecule in control of the frequency of an oscillator desirably operating at a frequency corresponding with the transition frequency between two of said energy states which comprises applying to the gas a field whose frequency corresponds with the oscillator frequency, generating microwave energy having a frequency corresponding with a microwave transition frequency between another two of said energy states, modulating said generated microwave energy and applying said modulated energy to said gas whereby jointly with the first-named field it produces resonant modulation absorption lines at microwave frequencies respectively higher and lower than said microwave transition frequency, and comparing the relative absorptions of microwave energy by said gas at two of said microwave frequencies as a measure of the frequency-deviation of said oscillator.

2. A method as in claim 1 in which the microwave absorptions compared are at the two resonant modulation frequencies and in which the microwave energy applied is of intensity low compared to the intensity of the oscillator-frequency field.

3. A method as in claim 1 in which the microwave absorptions compared are at said microwave transition frequency and at one of said resonant modulation frequencies.

4. A method as in claim 1 in which the frequency of the microwave field is repeatedly swept over a frequency range including the microwave transition frequency and at least one of said resonant modulation frequencies.

5. A method as in claim 1 in which the applied microwave field is of relatively low intensity and of frequency-repeatedly swept over a range including both of said resonant modulation frequencies and in which the microwave absorptions compared are at the two resonant modulation frequencies.

6. A method as in claim 5 in which the sweep range is controlled to maintain equal time spacings between the successive absorptions of the microwave energy.

7. A method of utilizing the resonant modulation characteristic of a gas having at least three permitted energy states of its molecule in control of the frequency of an oscillator desirably operating at a frequency differing by a predetermined amount from the transition frequency between two of said energy states which comprises applying to the gas a field whose frequency corresponds with said transition frequency, generating microwave energy having a frequency corresponding with a microwave transition frequency between another two of said energy states, modulating said generated microwave energy and applying said modulated energy to the gas whereby jointly with the first-named field it produces resonant modulation absorption lines at microwave frequencies respectively higher and lower than said microwave transition frequency, and comparing the relative absorptions of microwave energy by said gas at two of said microwave frequencies as a measure of the frequency-deviation of said oscillator.

8. A method of utilizing the resonant modulation characteristic of a gas having at least three permitted energy states of its molecule to stabilize an oscillator at a frequency desirably corresponding with the transition frequency between two of said energy states which comprises generating microwave energy at a frequency corresponding with a second transition frequency between another two of said energy states, modulating said microwave energy and applying said modulated energy to said gas, concurrently applying to the gas a radio-frequency field of frequency corresponding with the oscillator frequency to produce selective absorption at two frequencies respectively higher and lower than said second transition frequency, demodulating the microwave energy transmitted by the gas at said two absorption frequencies, and deriving from the demodulated energies a control effect varying in sense and magnitude with frequency deviations of the oscillator.

9. A method of utilizing the resonant modulation characteristic of a gas having at least three permitted energy states of its molecule to stabilize an oscillator at a frequency desirably corresponding with the transition frequency between two of said energy states which comprises, generating microwave energy at a frequency corresponding with a second transition frequency between another two of said energy states, modulating said microwave energy and applying said modulated energy to said gas, concurrently applying to the gas a radio-frequency field of frequency corresponding with the oscillator frequency to produce selective absorption at two frequencies respectively higher and lower than said second transition frequency, repeatedly sweeping the frequency of said microwave field through a range including said two absorption frequencies, demodulating the microwave energy transmitted by the gas to produce for each sweep a pair of pulses whose relative intensity corresponds in sense and magnitude with the frequency deviation of said oscillator, and deriving a control voltage from said paired pulses.

10. A method of utilizing the resonant modulation characteristic of a gas having at least three permitted energy states of its molecule to stabilize an oscillator at a frequency desirably corresponding with the transition frequency between two of said energy states which comprises repeatedly sweeping the frequency of a microwave field applied to the gas through a range including a second transition frequency between another two of said energy states, concurrently applying to the gas a field of frequency corresponding with the oscillator frequency to produce selective absorption at two frequencies respectively higher and lower than said second transition frequency, demodulating the microwave energy transmitted by the gas to produce paired pulses whose relative amplitudes corresponds in sense and magnitude with the frequency-deviation of the oscillator, and deriving from the paired pulses a frequency-control voltage of variable sense and magnitude applied to minimize said frequency deviations.

11. A method as in claim 10 in which the intensity of the oscillator frequency field is varied to adjust the stabilized oscillator frequency.

12. A method as in claim 11 in which the intensity of the oscillator frequency field is stabilized to avoid effect of changes in output of the oscillator upon the first transition frequency.

13. A method of utilizing the resonant modulation characteristic of a gas having at least three permitted energy states of its molecule to determine the frequency deviations of an oscillator desirably operating at a frequency corresponding with the transition frequency between two of said energy states which comprises applying to the gas a field whose frequency corresponds with the oscillator frequency, concurrently applying a microwave field to the gas, repeatedly sweeping the frequency of said microwave field through a range including a transition frequency between a third of said energy states and one of said two energy states, and demodulating the microwave energy transmitted by the gas to produce paired pulses whose relative amplitude is an accurate measure of the sense and extent of the deviations in frequency of said oscillator.

14. A system for controlling the frequency of an oscillator comprising a chamber confining gas having at least three permitted energy states, of its molecule, means including a microwave oscillator for generating a microwave field of frequency corresponding with a transition frequency between two of said energy states, means for modulating said microwave energy and applying said modulated energy to said gas, additional oscillator means for concurrently applying to said gas a radio-frequency field of frequency corresponding with the transition frequency between a third energy state and one of said two energy states to produce selective absorption of the microwave energy at two resonant modulation frequencies respectively higher and lower than said first-named transition frequency, means for comparing the absorptions of the microwave energy at said two selective absorption frequencies, and means for controlling the frequency of said additional oscillator means to maintain substantial equality of said absorptions of the microwave energy.

15. A system for controlling the frequency of an oscillator comprising a chamber confining gas having at least three permitted energy states of its molecule, means including a microwave oscillator for generating a microwave field of frequency corresponding with a transition frequency between two of said energy states, means for modulating said microwave energy and applying said modulated energy to said gas, means for concurrently applying to said gas a radio-frequency field of frequency differing by a predetermined amount from the oscillator frequency and corresponding with the transition frequency between a third energy state and one of said two energy states to produce selective absorption of the microwave energy at two resonant modulation frequencies respectively higher and lower than said first-named transmition frequency, means for comparing the absorptions of the microwave energy at said two selective absorption frequencies, and means for controlling the frequency of said radio-frequency to maintain substantial equality of said absorptions of the microwave energy.

16. A system as in claim 14 in which said modulating means comprises means for cyclically sweeping through a microwave range including said resonant modulation frequencies, means is provided for demodulating the microwave energy transmitted by the gas to produce paired pulses for each sweep cycle, and said comparing means comprises a network for producing an output of sense and magnitude dependent upon the relative amplitude of the paired pulses.

17. A system as in claim 14 in which said modulating means comprises means for cyclically sweeping the frequency of the microwave field through a range including said resonant modulation frequencies, means is provided for demodulating the microwave energy transmitted by the gas to produce paired pulses for each sweep cycle, and said comparing means comprises a network for producing an output voltage of polarity and magnitude corresponding with the relative intensity of the paired pulses.

18. A system as in claim 14 in which means are provided to stabilize the intensity of the radio-frequency field.

19. A system as in claim 16 in which the comparing network includes gating means controlled by one of the paired pulses.

20. A system as in claim 16 in which the comparing network is ungated and in which a second comparator controls said sweep means to maintain equal time spacing of the successive pulses.

21. A method of utilizing the resonant modulation characteristic of a gas having at least three permitted energy states of its molecule in control of the frequency of an oscillator desirably operating at a frequency having a predetermined relation to the transition frequency between two of said energy states which comprises applying to the gas a field whose frequency has said predetermined relation with the oscillator frequency, generating microwave energy at a frequency corresponding with a microwave transition frequency between another two of said energy states, modulating said microwave energy and applying said modulated energy to said gas whereby jointly with the first-named field it produces resonant modulation absorption lines at microwave frequencies respectively higher and lower than said microwave transition frequency, and comparing the relative absorptions of microwave energy by said gas at two of said microwave frequencies as a measure of the frequency-deviation of said oscillator.

22. A system for controlling the frequency of an oscillator comprising a chamber confining gas having at least three permitted energy states of its molecule, a microwave oscillator for generating microwave energy at a frequency corresponding with a transition frequency between two of said energy states, means for modulating said microwave energy and applying said modulated energy to said gas, means for concurrently applying to said gas a radio-frequency field of frequency having a predetermined relation to the oscillator frequency and corresponding with the transition frequency between a third energy state and one of said two energy states to produce selective absorption of the microwave energy at two resonant modulation frequencies respectively higher and lower than said first-named transition frequency, means for comparing the absorptions of the microwave energy at said two selective absorption frequencies, and means for controlling the oscillator frequency to maintain substantial equality of said absorptions of the microwave energy.

23. A system comprising a chamber, a gas within said chamber having at least three permitted energy states of its molecule, means comprising an oscillator to apply to said gas energy at a frequency having a predetermined relation to the transition frequency between two of said energy states, means for generating microwave energy at a frequency corresponding with a microwave transition frequency between another two of said energy states, means for modulating said microwave energy and applying said modulated energy to said gas, said oscillator energy and said field being applied concurrently to produce a pair of resonant absorption lines at frequencies respectively above and below said transition frequency, and means to compare the relative absorptions by said gas at the frequencies of said pair of lines.

24. The system claimed in claim 23, further comprising a feed-back connection from said comparing means to said oscillator to correct said oscillator frequency in a sense to restore it to said predetermined relation whenever there is any departure therefrom.

25. A frequency stabilization system comprising, a confined body of microwave resonant gas, means for applying microwave energy to said body of gas at a first frequency for which said gas is resonant, means for generating radio-frequency energy at a second frequency at which said gas is resonant which is low compared to said first frequency, means for applying said generated radio-frequency energy to said body of gas to alter the position in the frequency spectrum of a gas spectral line at said first frequency, means for deriving a control effect from said body of gas, and means for applying said control effect to said radio-frequency energy generating means to stabilize said second frequency.

26. A frequency stabilization system comprising, a confined body of microwave resonant gas, means for generating microwave energy at a first frequency for which said gas is resonant, means for modulating said generated microwave energy, means for applying said modulated microwave energy to said body of gas, means for generating radio-frequency energy at a second frequency at which said gas is resonant which is low compared to said first frequency, means for applying said generated radio-frequency energy to said body of gas to alter the position in the frequency spectrum of a gas spectral line at said first frequency, means for deriving a control effect from said body of gas, and means for applying said control effect to said radio-frequency energy generating means to stabilize said second frequency.

References Cited in the file of this patent

UNITED STATES PATENTS

| | | |
|---|---|---|
| 2,555,131 | Hershberger | May 29, 1951 |
| 2,555,150 | Norton | May 29, 1951 |
| 2,591,257 | Hershberger | Apr. 1, 1952 |
| 2,593,463 | Kinzer | Apr. 22, 1952 |

OTHER REFERENCES

"The Zeeman Effect in Microwave Molecular Spectra," by C. D. Jean, Physical Review, vol. 74, No. 10, November 15, 1948.